United States Patent
Kim et al.

(10) Patent No.: US 9,809,458 B2
(45) Date of Patent: Nov. 7, 2017

(54) METHOD FOR CONTROLLING BULK DENSITY OF CARBON NANOTUBE AGGLOMERATE

(71) Applicant: LG CHEM. LTD., Seoul (KR)

(72) Inventors: SungJin Kim, Daejeon (KR); Seungyong Son, Daejeon (KR); Dong Hyun Cho, Daejeon (KR); KyungYeon Kang, Daejeon (KR); Jinmyung Cha, Daejeon (KR); Jihee Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/438,816

(22) PCT Filed: Sep. 30, 2014

(86) PCT No.: PCT/KR2014/009231
§ 371 (c)(1),
(2) Date: Apr. 27, 2015

(87) PCT Pub. No.: WO2015/047048
PCT Pub. Date: Apr. 2, 2015

(65) Prior Publication Data
US 2015/0298974 A1  Oct. 22, 2015

(30) Foreign Application Priority Data

Sep. 30, 2013 (KR) .................. 10-2013-0116963
Jun. 16, 2014 (KR) .................. 10-2014-0072553
(Continued)

(51) Int. Cl.
*C01B 31/02* (2006.01)
*B01J 23/745* (2006.01)
(Continued)

(52) U.S. Cl.
CPC ......... *C01B 31/0233* (2013.01); *B01J 21/185* (2013.01); *B01J 23/70* (2013.01);
(Continued)

(58) Field of Classification Search
CPC . C01B 31/0233; C01B 31/00; C01B 2202/22; B01J 23/745; B01J 23/8472; B01J 21/02; B01J 37/08; B01J 35/0006
See application file for complete search history.

(56) References Cited

U.S. PATENT DOCUMENTS 6,808,746 B1  10/2004 Dai et al.
2010/0266478 A1* 10/2010 Kim .................. B01J 21/04
                                              423/447.1
(Continued)

FOREIGN PATENT DOCUMENTS

FR  2973382 A1 * 10/2012  ............. B82Y 30/00
JP  2009-508667 A  3/2009
(Continued)

OTHER PUBLICATIONS

Jeong, S.W., et al., "Synthesis of multi-walled carbon nanotubes using Co—Fe—Mo/Al2O3 catalytic powders in a fluidized bed reactor," Advanced Powder Technology, vol. 21, No. 2, Mar. 2010, pp. 93-99.

*Primary Examiner* — Richard M Rump
(74) *Attorney, Agent, or Firm* — Dentons US LLP

(57) ABSTRACT

The present invention relates to a method for producing a carbon nanotube aggregate whose bulk density is easily controllable. Therefore, the present invention provides a carbon nanotube aggregate suitable for use in various fields.

8 Claims, 7 Drawing Sheets

(30) Foreign Application Priority Data

Sep. 26, 2014 (KR) ........................ 10-2014-0129411
Sep. 26, 2014 (KR) ........................ 10-2014-0129449

(51) Int. Cl.
*B01J 37/08* (2006.01)
*B01J 23/847* (2006.01)
*B01J 21/18* (2006.01)
*B01J 23/70* (2006.01)
*B01J 35/00* (2006.01)
*C01B 32/158* (2017.01)
*C01B 32/162* (2017.01)
*B01J 23/22* (2006.01)
*B01J 23/28* (2006.01)
*B01J 23/88* (2006.01)
*B01J 23/887* (2006.01)

(52) U.S. Cl.
CPC ......... *B01J 23/745* (2013.01); *B01J 23/8472* (2013.01); *B01J 35/0026* (2013.01); *B01J 37/08* (2013.01); *C01B 32/158* (2017.08); *C01B 32/162* (2017.08); *B01J 23/22* (2013.01); *B01J 23/28* (2013.01); *B01J 23/88* (2013.01); *B01J 23/8877* (2013.01); *C01B 2202/22* (2013.01)

(56) References Cited

U.S. PATENT DOCUMENTS

| | | | | |
|---|---|---|---|---|
| 2011/0218288 A1* | 9/2011 | Kambara | ................ | B01J 21/04 524/495 |
| 2013/0207026 A1* | 8/2013 | Kim | ................... | C01B 31/0233 252/71 |
| 2014/0018469 A1* | 1/2014 | Korzhenko | ............ | B82Y 30/00 523/201 |
| 2014/0255698 A1* | 9/2014 | Kang | ...................... | B01J 23/75 428/402 |
| 2014/0328744 A1* | 11/2014 | Kang | ................. | C01B 31/0206 423/447.3 |
| 2014/0329085 A1* | 11/2014 | Kim | ....................... | B82B 1/001 428/367 |

FOREIGN PATENT DOCUMENTS

| | | | | |
|---|---|---|---|---|
| JP | 2012082077 A | 4/2012 | | |
| JP | 2012213716 A | 11/2012 | | |
| KR | 10-2009-0090738 A | 8/2009 | | |
| KR | 10-1007183 B1 | 1/2011 | | |
| KR | 10-2013-0034328 A | 4/2013 | | |
| KR | WO 2013095045 A1 * | 6/2013 | ............. | C01B 31/02 |
| KR | 10-2013-0082458 A | 7/2013 | | |
| KR | WO 2013105779 A1 * | 7/2013 | .............. | B01J 23/75 |
| KR | WO 2013105784 A1 * | 7/2013 | ......... | C01B 31/0206 |
| WO | 2011108492 A | 9/2011 | | |

\* cited by examiner

METHOD FOR CONTROLLING BULK DENSITY OF CARBON NANOTUBE AGGLOMERATE

This application is a National Stage Application of International Application No. PCT/KR2014/009231, filed Sep. 30, 2014, and claims priority to and benefit of Korean Patent Application Nos. 10-2014-0129411 filed Sep. 26, 2014, 10-2014-0129449 filed Sep. 26, 2014, 10-2014-0072553 filed Jun. 16, 2014, and 10-2013-0116963 filed Sep. 30, 2013, all of which are hereby incorporated by reference in their entirety for all purposes as if fully set forth herein.

BACKGROUND OF THE INVENTION

1. Field of the Invention

The present invention relates to a method for producing a carbon nanotube aggregate, and more particularly to a method for producing a bundle type carbon nanotube aggregate with controlled bulk density.

2. Description of the Related Art

Carbon nanostructures (CNSs) refer collectively to nano-sized carbon structures having various shapes, such as nanotubes, nanohairs, fullerenes, nanocones, nanohorns, and nanorods. Carbon nanostructures can be widely utilized in a variety of technological applications because they possess excellent characteristics.

Particularly, carbon nanotubes (CNTs) are tubular materials consisting of carbon atoms arranged in a hexagonal pattern and have a diameter of approximately 1 to 100 nm. Carbon nanotubes exhibit insulating, conducting or semiconducting properties depending on their inherent chirality. Carbon nanotubes have a structure in which carbon atoms are strongly covalently bonded to each other. Due to this structure, carbon nanotubes have a tensile strength approximately 100 times that of steel, are highly flexible and elastic, and are chemically stable.

Carbon nanotubes are divided into three types: single-walled carbon nanotubes (SWCNTs) consisting of a single sheet and having a diameter of about 1 nm; double-walled carbon nanotubes (DWCNTs) consisting of two sheets and having a diameter of about 1.4 to about 3 nm; and multi-walled carbon nanotubes (MWCNTs) consisting of three or more sheets and having a diameter of about 5 to about 100 nm.

Carbon nanotubes are being investigated for their commercialization and application in various industrial fields, for example, aerospace, fuel cell, composite material, biotechnology, pharmaceutical, electrical/electronic, and semiconductor industries, due to their high chemical stability, flexibility and elasticity. However, carbon nanotubes have a limitation in directly controlling the diameter and length to industrially applicable dimensions for practical use owing to their primary structure. Accordingly, the industrial application and use of carbon nanotubes are limited despite their excellent physical properties.

Carbon nanotubes are generally produced by various techniques, such as arc discharge, laser ablation, and chemical vapor deposition. However, arc discharge and laser ablation are not appropriate for mass production of carbon nanotubes and require high arc production costs or expensive laser equipment. Chemical vapor deposition using a vapor dispersion catalyst has the problems of a very low synthesis rate and too small a size of final carbon nanotube particles. Chemical vapor deposition using a substrate-supported catalyst suffers from very low efficiency in the utilization of a reactor space, thus being inappropriate for mass production of carbon nanotubes. Thus, studies on catalysts and reaction conditions for chemical vapor deposition are currently underway to increase the yield of carbon nanotubes.

Catalytically active components of the catalysts usually take the form of oxides, partially or completely reduced products, or hydroxides. The catalysts may be, for example, supported catalysts or coprecipitated catalysts, which can be commonly used for carbon nanotube production. Supported catalysts are preferably used for the following reasons: supported catalysts have a higher inherent bulk density than coprecipitated catalysts; unlike coprecipitated catalysts, supported catalysts produce a small amount of a fine powder with a size of 10 microns or less, which reduces the possibility of occurrence of a fine powder due to attrition during fluidization; and high mechanical strength of supported catalysts effectively stabilizes the operation of reactors.

Particularly, carbon nanotubes whose bulk density is at a constant level are advantageous for the production of an aggregate of carbon nanotubes using a fluidized bed reactor.

A need also exists for bundle type carbon nanotubes that have a small diameter and are readily dispersible in and miscible with polymers during compounding with the polymers, thus being suitable for use in the manufacture of composite materials with improved physical properties.

SUMMARY OF THE INVENTION

It is an object of the present invention to provide a method for producing a carbon nanotube aggregate with controlled bulk density in high yield in which the carbon nanotubes have a bundle type structure that facilitates dispersion in and mixing with a polymer during compounding with the polymer.

It is another object of the present invention to provide a composite material including a carbon nanotube aggregate produced by the method.

One aspect of the present invention provides a method for producing a carbon nanotube aggregate, including calcining aluminum hydroxide at a primary calcination temperature of 100° C. to 500° C. to form a support, supporting a catalytic metal precursor on the support, calcining the catalyst-containing support at a secondary calcination temperature of 100° C. to 800° C. to obtain a supported catalyst, and bringing the supported catalyst into contact with a carbon-containing compound under heating to react with each other wherein the primary calcination temperature, the secondary calcination temperature, the amount of the catalyst supported or the reaction time is controlled such that the carbon nanotube aggregate has a bulk density of 10 kg/m³ or more.

A further aspect of the present invention provides a carbon nanotube aggregate produced by the method.

Another aspect of the present invention provides a composite material including a carbon nanotube aggregate produced by the method.

The method of the present invention enables the production of a bundle type carbon nanotube aggregate that is readily dispersible in and miscible with other materials and whose bulk density is controllable. Therefore, the bundle type carbon nanotube aggregate can be used to manufacture a composite material with improved physical properties. As a result, the carbon nanotube aggregate is suitable for use in various fields, such as energy materials, functional composites, pharmaceuticals, batteries, semiconductors, display devices, and manufacturing methods thereof.

DETAILED DESCRIPTION OF THE INVENTION

Figure 1:
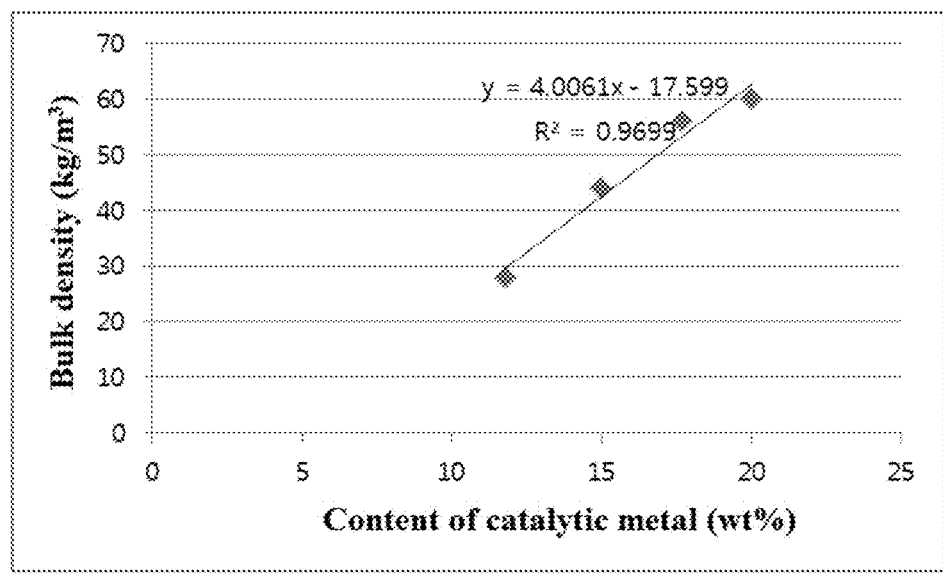
FIGS. 1 and 2 are graphs each showing changes in the bulk density of carbon nanotube aggregates produced in Examples 3 and 4, with varying contents of a catalytic metal in the carbon nanotube aggregates.

The present invention will now be described in detail.

The present invention provides a method for producing a carbon nanotube aggregate, including calcining aluminum hydroxide at a primary calcination temperature of 100° C. to 500° C. to form a support, supporting a catalytic metal precursor on the support, calcining the catalyst-containing support at a secondary calcination temperature of 100° C. to 800° C. to obtain a supported catalyst, and bringing the supported catalyst into contact with a carbon-containing compound under heating to react with each other wherein the primary calcination temperature, the secondary calcination temperature, the amount of the catalyst supported or the reaction time is controlled such that the carbon nanotube aggregate has a bulk density of 10 kg/m³ or more.

According to one embodiment, the carbon nanotube aggregate may have a bulk density of 100 kg/m³ or less.

According to one embodiment, at least a portion of the carbon nanotube aggregate may be of a bundle type.

According to one embodiment, the secondary calcination temperature may be higher by 200 to 400° C. than the primary calcination temperature.

According to one embodiment, the primary calcination temperature may be from 300 to 500° C. and the secondary calcination temperature may be from 550 to 800° C.

According to one embodiment, the catalytic metal may include Fe, Co, Mo, V or a combination of two or more thereof.

According to one embodiment, the bulk density of the carbon nanotube aggregate may increase with increasing secondary calcination temperature until 675° C. and thereafter may decrease with increasing secondary calcination temperature.

According to one embodiment, the catalytic metal may be present in an amount of 5 to 30% by weight, based on the total weight of the catalyst.

According to one embodiment, the content ($x_1$) of the catalytic metal and the bulk density (y) of the carbon nanotube aggregate may satisfy the relation given by the following equation:

$$y = a_1 x_1 + b_1 \quad (1)$$

where y represents the bulk density (kg/m³), $x_1$ represents the content of the catalytic metal relative to the total weight of the catalyst and is from 10 to 30 wt %, $a_1$ is a constant determined by the reaction time and is from 4 to 6.5, and $b_1$ is a constant determined by the reaction time and is from −15 to −40.

According to one embodiment, the bulk density of the carbon nanotube aggregate may increase by 1.2 to 1.5 times in proportion to the time (hr) of the reaction with the carbon-containing compound.

According to one embodiment, an organic acid may be added in a molar ratio of 5:1 to 30:1 relative to the catalytic metal for the preparation of the supported catalyst and the bulk density of the carbon nanotube aggregate may be controlled by varying the amount of the organic acid added.

According to one embodiment, the number of moles ($x_2$) of the catalytic metal per mole of the organic acid and the bulk density (y) of the carbon nanotube aggregate may satisfy the relation given by the following equation:

$$y = a_2 x_2 + b_2 \quad (2)$$

where y represents the bulk density (kg/m³), $x_2$ represents the number of moles of the catalytic metal per mole of the organic acid, $a_2$ is a constant from 1 to 1.5, and $b_2$ is a constant from 20 to 40.

According to one embodiment, the reaction with the carbon-containing compound may be carried out in a fluidized bed reactor.

The present invention also provides a carbon nanotube aggregate produced by the method.

The present invention also provides a composite material including the carbon nanotube aggregate.

The composite material may have a conductivity within the range given by the following inequality:

$$0.1 x_3 + 1 \leq \text{Log } R \leq 0.1 x_3 + 4 \quad (3)$$

where $x_3$ represents the bulk density (kg/m³) of the carbon nanotube aggregate and R represents the surface resistivity (ohm/sq) of the composite material.

Reference will be made in more detail to embodiments of the present invention.

The present invention is directed to a method for producing a carbon nanotube aggregate whose bulk density is controllable.

The method of the present invention includes calcining aluminum hydroxide at a primary calcination temperature of 100° C. to 500° C. to form a support, supporting a catalytic metal precursor on the support, calcining the catalyst-containing support at a secondary calcination temperature of 100° C. to 800° C. to obtain a supported catalyst, and bringing the supported catalyst into contact with a carbon-containing compound under heating to react with each other wherein the primary calcination temperature, the secondary calcination temperature, the amount of the catalyst supported or the reaction time is controlled such that the carbon nanotube aggregate has a bulk density of 10 kg/m³ or more.

As a result of intensive research, the inventors have found that the bulk density of the carbon nanotube aggregate is controlled by varying the processing conditions such as the primary calcination temperature at which the support is calcined, the secondary calcination temperature at which the catalyst is calcined, the amount of the catalyst supported, and the reaction time. The method of the present invention enables the production of a bundle type carbon nanotube aggregate with controlled bulk density that is readily dispersed in a polymer, which is particularly advantageous for the manufacture of a polymeric composite material.

A support precursor playing a role in supporting the metal catalyst is used to prepare the supported catalyst. As the support precursor, there may be used an aluminum-based support precursor, for example, aluminum trihydroxide (ATH). The support precursor may be pretreated, for example, by drying at about 50 to about 150° C. for about 1 to about 24 hours, before use.

The support is formed by primary calcination of the support precursor. The primary calcination temperature is much lower than 800° C. known as the temperature at which aluminum trihydroxide is converted to alumina and may be, for example, lower than 500° C. The support, for example, the aluminum-based support, preferably includes at least 30% by weight of AlO(OH), which is converted from Al(OH)$_3$, but does not include Al$_2$O$_3$. Specifically, the primary calcination may include heat treatment at a temperature of about 100 to about 500° C. or about 300 to about 500° C.

The aluminum (Al)-based support may further include at least one metal oxide selected from the group consisting of ZrO$_2$, MgO, and SiO$_2$. The shape of the aluminum (Al)-based support is not particularly limited and may be, for example, spherical or potato-like. The aluminum (Al)-based support may have a structure suitable to provide a relatively large surface area per unit weight or volume, such as a porous structure, a molecular sieve structure or a honeycomb structure.

According to one embodiment, the support precursor may have a particle diameter of about 20 to about 200 µm, a porosity of about 0.1 to about 1.0 cm³/g, and a specific surface area smaller than about 1 m²/g.

The primary calcination for the formation of the support from the support precursor may be performed in the range of about 0.5 to about 10 hours, for example, about 1 to about 5 hours, but is not limited to this range.

A graphitization metal catalyst may be supported on the support. The graphitization metal catalyst plays a role in helping the carbon components present in the carbon source in the gas phase bind to each other to form hexagonal ring structures.

The graphitization metal catalyst may be used alone as a main catalyst. Alternatively, the graphitization metal catalyst may be a composite catalyst consisting of a main catalyst and an auxiliary catalyst. In this case, the main catalyst may include iron (Fe) or cobalt (Co) and the auxiliary catalyst may be molybdenum (Mo), vanadium (V) or a combination thereof. The auxiliary catalyst may be used in an amount ranging from about 0.1 to about 10 moles or from about 0.5 to about 5 moles, based on 10 moles of the main catalyst. For example, the composite catalyst may be selected from FeCo, CoMo, CoV, FeCoMo, FeMoV, FeV, FeCoMoV, and combinations thereof.

The graphitization catalyst is supported in the form of a precursor, for example, a metal salt, a metal oxide or a metal compound, on the support. Examples of suitable precursors of the graphitization catalyst include Fe salts, Fe oxides, Fe compounds, Co salts, Co oxides, Co compounds, Mo oxides, Mo compounds, Mo salts, V oxides, V compounds, and V salts. Other examples of suitable precursors include Fe(NO$_3$)$_2$.6H$_2$O, Fe(NO$_3$)$_2$.9H$_2$O, Fe(NO$_3$)$_3$, Fe(OAc)$_2$, Co(NO$_3$)$_2$.6H$_2$O, Co$_2$(CO)$_8$, [Co$_2$(CO)$_6$(t-BuC≡CH)], Co(OAc)$_2$, (NH$_4$)$_6$Mo$_7$O$_{24}$.4H$_2$O, Mo(CO)$_6$, (NH$_4$)MoS$_4$, and NH$_4$VO$_3$.

The precursor of the graphitization catalyst is supported in the form of a solution on the support, followed by secondary calcination. As a result of the secondary calcination, the precursor is supported usually in the form of a metal oxide in the supported catalyst.

For example, the supported catalyst may be prepared by the following procedure. First, the support (e.g., a granular aluminum-based support) obtained by the primary calcination is mixed with an aqueous solution of the graphitization catalyst precursor to form a paste. Then, the paste is dried and secondarily calcined at a temperature of about 100° C. to about 800° C. to prepare the supported catalyst having a structure in which the surface and pores of the support are impregnated and coated with the graphitization catalyst components.

According to one embodiment, the drying may be performed by rotary evaporation of the mixture of the aqueous solution of the graphitization catalyst precursor and the support under vacuum at a temperature ranging from about 40 to about 100° C. for a time ranging from about 30 minutes to about 12 hours.

According to one embodiment, the mixture may be aged with rotation or stirring at about 45 to about 80° C. before the drying. The aging may be performed for a maximum of 5 hours, for example, 20 minutes to 5 hours or 1 to 4 hours.

The secondary calcination may be performed at a temperature of about 100° C. to about 800° C., for example, about 200° C. to about 800° C. or 550° C. to about 800° C. It is preferred that the secondary calcination temperature is higher by 200 to 400° C. than the primary calcination temperature.

According to one embodiment of the present invention, the bulk density of the carbon nanotube aggregate may increase with increasing secondary calcination temperature until 675° C. and thereafter may decrease with increasing secondary calcination temperature. Based on this feature, the bulk density of the carbon nanotube aggregate can also be controlled.

The paste is dried under vacuum to obtain a particulate material. The particulate material may have a particle diameter (or average particle diameter) of about 30 to about 150 µm, as measured before the secondary calcination. Each of the granular support and the graphitization catalyst may have a spherical or potato-like shape with a primary particle diameter of about 10 to about 50 nm. The spherical or potato-like shape refers to a three-dimensional shape having an aspect ratio of 1.2 or less such as a sphere or ellipse.

According to one embodiment, the amount of the graphitization catalyst may be from about 5 to about 30% by weight, based on the total weight of the supported catalyst, but is not limited thereto.

According to one embodiment of the present invention, the bulk density of the resulting carbon nanotube aggregate may increase with increasing amount of the graphitization catalyst supported.

Specifically, the content ($x_1$) of the catalytic metal and the bulk density (y) of the carbon nanotube aggregate may satisfy the relation given by the following equation:

$$y = a_1 x_1 + b_1 \quad (1)$$

where y represents the bulk density (kg/m$^3$), $x_1$ represents the content of the catalytic metal relative to the total weight of the catalyst and is from 10 to 30 wt %, $a_1$ is a constant determined by the reaction time and is from 4 to 7, and $b_1$ is a constant determined by the reaction time and is from −15 to −40.

Figure 2:
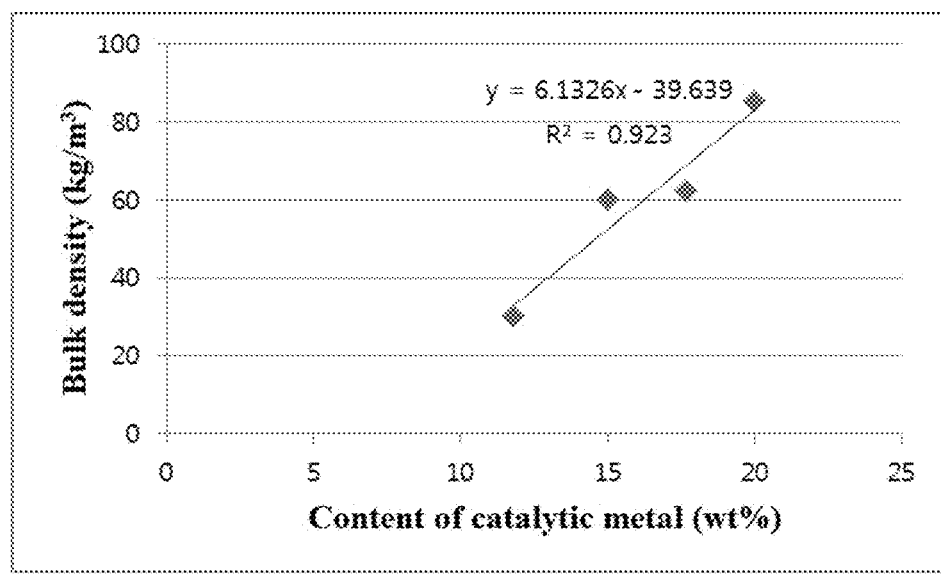

FIGS. 1 and 2 are graphs each showing changes in the bulk density of carbon nanotube aggregates produced in Examples 3 and 4, with varying contents of a catalytic metal in the carbon nanotube aggregates. FIGS. 1 and 2 show the results when the reaction times were 1 hour and 2 hours, respectively, and the other processing conditions were the same. Each of the graphs shows that the bulk density increases linearly with the catalytic metal content. These results indicate that the bulk densities of the carbon nanotube aggregates are easy to control.

The bulk densities of the carbon nanotube aggregates tend to increase as reaction time increases. As a result of experiments conducted by the present inventors, the bulk density of the carbon nanotube aggregate increases by 1.2 to 1.5 times when the reaction time increases by 1 hour.

According to one embodiment, the supported catalyst may have a structure in which the surface and pores of the granular support, preferably the aluminum-based support, are coated with a monolayer or multilayer of the graphitization catalyst.

The supported catalyst is preferably prepared by an impregnation method for the following reasons: the supported catalyst has a higher inherent bulk density than coprecipitated catalysts; unlike coprecipitated catalysts, the supported catalyst produces a small amount of a fine powder with a size of 10 microns or less, which reduces the possibility of occurrence of a fine powder due to attrition during fluidization; and high mechanical strength of the supported catalyst effectively stabilizes the operation of a fluidized bed reactor.

According to one embodiment, an organic acid may be added in a molar ratio of 5:1 to 30:1 relative to the catalytic metal for the preparation of the supported catalyst and the bulk density of the carbon nanotube aggregate may be controlled by varying the amount of the organic acid added.

Specifically, the number of moles ($x_2$) of the catalytic metal per mole of the organic acid and the bulk density (y) of the carbon nanotube aggregate may satisfy the relation given by the following equation:

$$y = a_2 x_2 + b_2 \quad (2)$$

where y represents the bulk density (kg/m$^3$), $x_2$ represents the number of moles of the catalytic metal per mole of the organic acid, $a_2$ is a constant from 1 to 1.5, and $b_2$ is a constant from 20 to 40.

Figure 3:
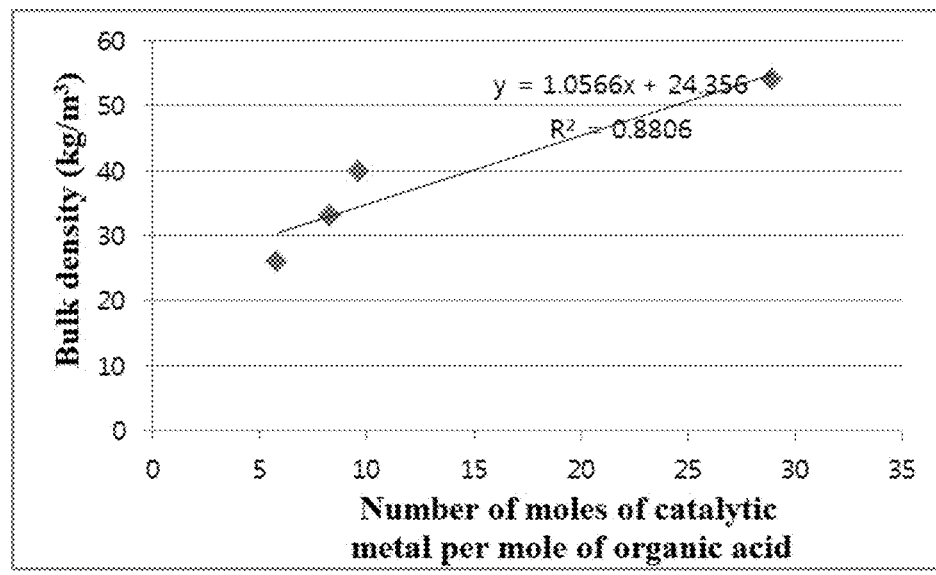
FIGS. 3 and 4 are graphs each showing changes in the bulk density of carbon nanotube aggregates produced in Example 5, with varying numbers of mole of a catalytic metal per mole of an organic acid.
Figure 4:
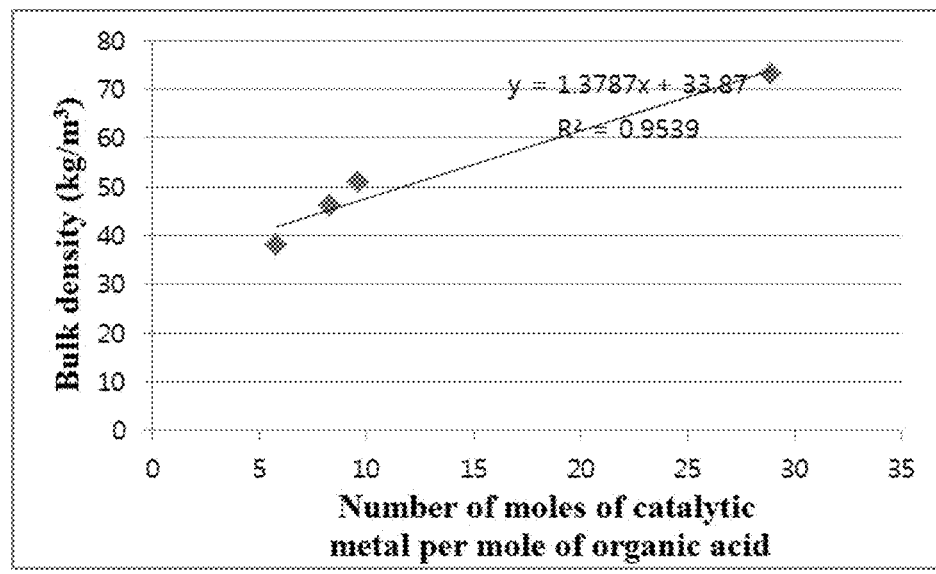

FIGS. 3 and 4 are graphs each showing changes in the bulk density of carbon nanotube aggregates produced in Example 5, with varying numbers of mole of a catalytic metal per mole of an organic acid. FIGS. 3 and 4 show the results when the reaction times were 1 hour and 2 hours, respectively, and the other processing conditions were the same. Each of the graphs shows that the bulk density increases linearly with the number of moles of the catalytic metal relative to the organic acid. Based on this feature, the bulk densities of the carbon nanotube aggregates are easy to control.

The supported catalyst containing the graphitization catalyst may be brought into contact with the carbon source in the gas phase under heating to produce carbon nanotube aggregate. A detailed description will be given of the growth of carbon nanotubes. First, a carbonaceous material as the gas-phase carbon source is brought into contact with the graphitization catalyst supported in the supported catalyst, followed by heat treatment. As a result of the heat treatment, the carbonaceous material is thermally decomposed on the surface of the graphitization catalyst and carbon atoms formed from the carbon-containing gas as a result of the decomposition are infiltrated into and solubilized in the graphitization catalyst. If the amount of the carbon atoms infiltrated exceeds the solubility limit, an inherent feature of the graphitization catalyst, the carbon atoms form nuclei, which grow into carbon nanotubes.

According to one embodiment, the carbon nanotubes grown on the supported catalyst may have a bundle type structure. Due to this structure, the bundle type carbon nanotubes are readily dispersible in and miscible with polymers during compounding with the polymers.

Unless otherwise mentioned, the term "bundle type" used herein refers to a secondary shape of carbon nanotubes in which the carbon nanotubes are arranged in parallel or get entangled to form bundles or ropes, and the term "non-bundle or entangled type" used herein refers to a type of carbon nanotubes that does not have a specific shape such as a bundle- or rope-like shape.

The carbon nanotube aggregate of the present invention, which is produced using the supported catalyst, may have a bulk density of at least 10 kg/m$^3$, 20 to 100 kg/m$^3$, 20 to 90 kg/m$^3$ or 20 to 80 kg/m$^3$.

According to one embodiment of the present invention, the bundle type carbon nanotubes may be produced by primarily calcining the support precursor at a primary calcination temperature, for example, at a temperature of 100 to 500° C., to obtain the support, supporting an iron-containing graphitization catalyst on the support, secondarily calcining the catalyst-containing support at a temperature of 100 to 800° C. to prepare the supported catalyst, and bringing the supported catalyst into contact with the carbon source in the gas phase.

The use of the supported catalyst allows for growth of carbon nanotubes by chemical vapor synthesis through decomposition of the carbon source, leading to the production of carbon nanotubes.

According to the chemical vapor synthesis, the iron-containing graphitization catalyst is charged into a reactor and the carbon source in the gas phase is then supplied to the reactor at ambient pressure and high temperature to produce a carbon nanotube aggregate in which the carbon nanotubes are grown on the supported catalyst. A hydrocarbon as the carbon source is thermally decomposed and is infiltrated into and saturated in the graphitization catalyst. Carbon is deposited from the saturated graphitization catalyst and forms hexagonal ring structures.

The chemical vapor synthesis can be performed in such a manner that the supported catalyst is fed into a horizontal fixed bed reactor or fluidized bed reactor and at least one carbon source selected from $C_1$-$C_6$ saturated or unsaturated hydrocarbons, and optionally together with a mixed gas of a reducing gas (e.g., hydrogen) and a carrier gas (e.g., nitrogen) is introduced into the reactor at a temperature of about 500 to about 900° C., about 600 to 750° C. or about 660 to about 690° C. Carbon nanotubes may be grown for 30 minutes to 8 hours after the carbon source is introduced into the supported catalyst. The use of a fluidized bed reactor is more preferred.

The type of a heat source for the calcination or heat treatment in the method is not limited and may be, for example, induction heating, radiant heating, laser, IR, microwave, plasma, UV or surface plasmon heating.

Any carbon source used for the chemical vapor synthesis may be used without particular limitation so long as it can supply carbon and can exist in the gas phase at a temperature of 300° C. or more. The gas-phase carbonaceous material may be any carbon-containing compound. The gas-phase carbonaceous material is preferably a compound consisting of up to 6 carbon atoms, more preferably a compound consisting of up to 4 carbon atoms. Examples of such gas-phase carbonaceous materials include, but are not limited to, carbon monoxide, methane, ethane, ethylene, ethanol, acetylene, propane, propylene, butane, butadiene, pentane, pentene, cyclopentadiene, hexane, cyclohexane, benzene, and toluene. These gas-phase carbonaceous materials may be used alone or as a mixture thereof. The mixed gas of hydrogen and nitrogen transports the carbon source, prevents carbon nanotubes from burning at high temperature, and assists in the decomposition of the carbon source.

The gas-phase carbon source, hydrogen, and nitrogen may be used in various volume ratios, for example, 1:0.1-10:0-10 or 1:0.5-1.5:0.5-1.5. The reaction gases may be appropriately supplied at a flow rate ranging from about 100 to about 10,000 sccm.

After growth of carbon nanotubes by heat treatment at high temperature, the carbon nanotubes are cooled. Due to this cooling, the carbon nanotubes are more regularly aligned. The carbon nanotubes may be naturally cooled (by removal of the heat source) or may be cooled at a rate of about 5 to about 30° C./min.

The carbon nanotubes thus produced are of a bundle type and have a BET specific surface area of at least about 200 $m^2/g$, preferably about 200 $m^2/g$ to about 500 $m^2/g$. The specific surface area can be measured by the general BET method.

The method of the present invention enables the production of a carbon nanotube aggregate in high yield, for example, about 5 to about 50 times or about 10 to 40 times. The yield of the carbon nanotube aggregate can be determined by measuring the content of the carbon nanotube aggregate obtained at room temperature using an electronic scale. The reaction yield can be calculated by substituting the weight of the supported catalyst used and the total weight after the reaction into the following expression:

Yield of carbon nanotube aggregate(times)=(the total weight after the reaction(g)−the weight of the supported catalyst used(g))/the weight of the supported catalyst used(g)

The carbon nanotube aggregate may be of a bundle type and may have an aspect ratio of about 0.9 to about 1. In addition, the carbon nanotubes may have a strand diameter of about 2 nm to about 20 nm, preferably about 3 nm to about 8 nm. The strand diameter of the carbon nanotubes decreases with increasing BET specific surface area.

The aspect ratio can be defined by the following expression:

Aspect ratio=the shortest diameter passing through the center of carbon nanotube/the longest diameter passing through the center of nanotube As described above, the carbon nanotube aggregate has a large BET specific surface area, i.e. a small diameter, and is of a bundle type. Based on such characteristics, the carbon nanotube aggregate is readily dispersible in and miscible with other materials, for example, polymers, and can thus be used to manufacture composite materials with improved physical properties.

The present invention also provides a composite material including the carbon nanotube aggregate. The conductivity of the composite material according to the present invention may decrease with increasing bulk density of the carbon nanotube aggregate.

According to one embodiment, the bulk density ($kg/m^3$) of the carbon nanotubes and the log value of the surface resistivity (ohm/sq) (Log R) of the composite material may satisfy the relation given by the following inequality:

$$0.1x_3+1 \leq \text{Log } R \leq 0.1x_3+4 \quad (3)$$

where $x_3$ represents the bulk density ($kg/m^3$) of the carbon nanotube aggregate and R represents the surface resistivity (ohm/sq) of the composite material.

More preferably, the bulk density and the Log R satisfy the relation given by the following inequality:

$$0.1x_3+2 \leq \text{Log } R \leq 0.1x_3+3$$

where $x_3$ and R are as defined above.

Therefore, the carbon nanotube aggregate of the present invention is suitable for use in the manufacture of various display devices, such as LCDs, OLEDs, PDPs, and e-papers, electrode structures, such as solar cells, fuel cells, lithium batteries, and supercapacitors, functional composite materials, energy materials, pharmaceuticals, and semiconductors, such as FETs.

The following examples are provided to assist in understanding the invention. However, it will be obvious to those skilled in the art that these examples are merely illustrative and various modifications and changes are possible without departing from the scope and spirit of the invention. Accordingly, it should be understood that such modifications and changes are encompassed within the scope of the appended claims.

EXAMPLE 1

A. Preparation of Aqueous Solution of Graphitization Metal Catalyst Precursor 2,424 g of $Fe(NO_3)_2 \cdot 6H_2O$, a precursor of Fe as a graphitization catalyst, was added to 2,000 g of water in flask A. The aqueous metal solution was observed to be clear and free of precipitates.

B. Preparation of Support

Aluminum trihydroxide ($Al(OH)_3$, ATH) as an aluminum-based support was primarily calcined at 300-500° C. for 4 h to obtain a support. 2,000 g of the support was placed in flask B. XRD analysis revealed the presence of 40 wt % or more of AlO(OH) in the calcined support.

C. Preparation of Supported Catalyst 4,424 g of the solution in flask A was added to flask B such that the number of moles of Fe was 30 moles when the number of moles of the support (2,000 g) was assumed to be 100 moles. The mixture was weighed and aged with stirring in a thermostatic bath at 60° C. for 5 min to sufficiently support the graphitization catalytic metal precursor on ATH400. The aged graphitization catalyst supported on the support was rotated at 80 rpm and dried under vacuum for 60 min while maintaining the temperature. The dried catalyst was weighed to calculate the amount of water removed (ca. 14.1%). The dried catalyst was secondarily calcined at 550-700° C. for 4 h to prepare a supported catalyst.

D. Synthesis of Carbon Nanotube Aggregate

Carbon nanotubes were synthesized using the supported catalyst in a fixed bed reactor on a laboratory scale.

Specifically, the supported catalyst was mounted at the center of a quartz tube having an inner diameter of 55 mm and heated to 670° C. under a nitrogen atmosphere. A mixed gas of nitrogen, hydrogen and ethylene gas in the same volumes was allowed to flow at a rate of 180 ml/min for a total of 1 h while maintaining the same temperature, affording a carbon nanotube aggregate.

Figure 5:
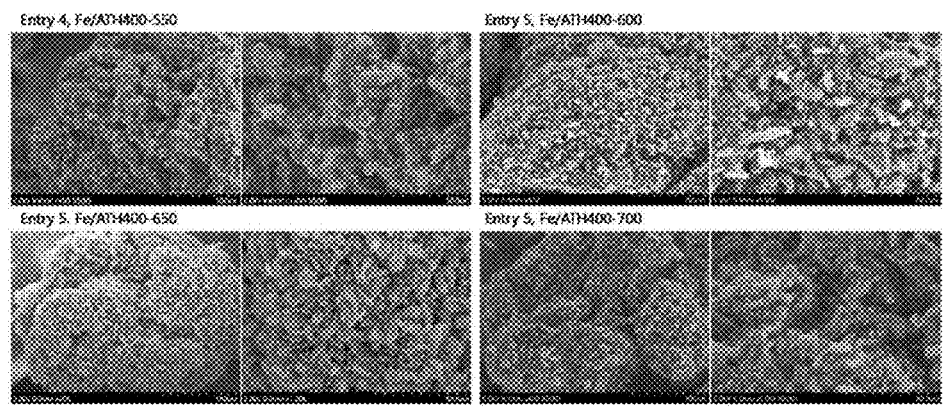
FIG. 5 shows SEM images of carbon nanotube aggregates produced in Example 1.

The procedure was repeated except that the primary and secondary calcination temperatures were changed as shown in Table 1. The yields and bulk densities of the resulting carbon nanotube aggregates are shown in Table 1. FIG. 5 shows SEM images of the carbon nanotube aggregates.

TABLE 1

| Entry | Catalyst | Temperature for ATH calcination (° C.) | Temperature for catalyst calcination (° C.) | Yield (times) | Bulk density (kg/m³) |
|---|---|---|---|---|---|
| 1 | Fe/ATH300-600 | 300 | 600 | 4.3 | 40 |
| 2 | Fe/ATH400-600 | 400 | 600 | 4.3 | 40 |
| 3 | Fe/ATH500-600 | 500 | 600 | 4.5 | 37 |
| 4 | Fe/ATH400-550 | 400 | 550 | 4.1 | 50 |
| 5 | Fe/ATH400-600 | 400 | 600 | 4.3 | 40 |
| 6 | Fe/ATH400-650 | 400 | 650 | 3.9 | 37 |
| 7 | Fe/ATH400-700 | 400 | 700 | 4.3 | 40 |

As can be seen from the results in Table 1, the highest bulk density was obtained for the carbon nanotube aggregate produced using the Fe catalyst calcined at 550° C. The SEM images in the upper left of FIG. 5 show an increased distribution of the entangled carbon nanotubes.

EXAMPLE 2

Changes in the bulk density of carbon nanotube aggregates were observed with varying temperatures for catalyst calcination. Catalysts were prepared in the same manner as in Example 1, except that Co/V (10:1 molar ratio) was used instead of Fe, the primary calcination temperature was fixed to 400° C., the secondary calcination was performed at different temperatures of 600-700° C., and citric acid was added in a molar ratio of 1:23 relative to Co. Carbon nanotube aggregates were synthesized using the catalysts in the same manner as in Example 1. When the reaction times were 1 h and 2 h, the yields and bulk densities of the carbon nanotube aggregates are shown in Table 2.

TABLE 2

| Entry | Catalyst | Temperature for catalyst calcination (° C.) | Reaction time (h) | Yield (times) | Bulk density (kg/m³) |
|---|---|---|---|---|---|
| 1 | CoV/ATH400-600 | 600 | 1 | 18.51 | 32 |
| | | | 2 | 36.31 | 44 |
| 2 | CoV/ATH400-650 | 650 | 1 | 26.32 | 42 |
| | | | 2 | 55.53 | 56 |
| 3 | CoV/ATH400-675 | 675 | 1 | 25.50 | 44 |
| | | | 2 | 57.00 | 60 |
| 4 | CoV/ATH400-700 | 700 | 1 | 24.03 | 37 |
| | | | 2 | 51.00 | 52 |

Figure 6:
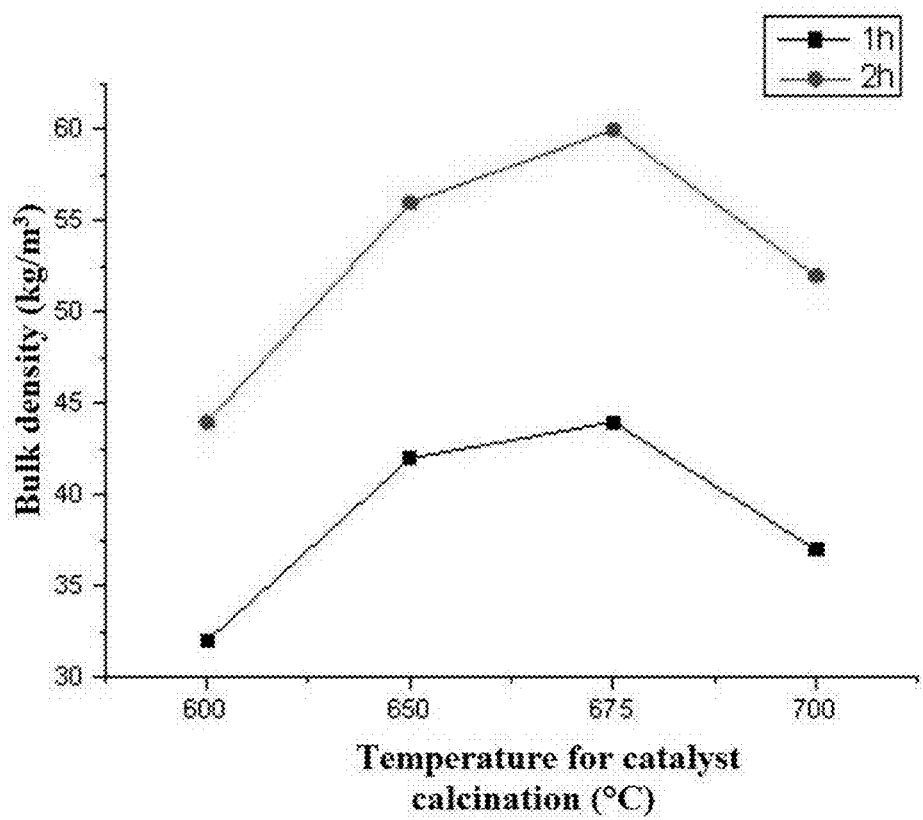
FIG. 6 is a graph showing changes in the bulk density of carbon nanotube aggregates with varying calcination temperatures in Example 2.

The results in Table 2 are graphically shown in FIG. 6. The graph reveals that the bulk densities of the carbon nanotube aggregates increased with increasing secondary calcination temperature until 675° C. and thereafter decreased with increasing secondary calcination temperature. The bulk density increased with increasing reaction time, but the tendency of the bulk density to change depending on the secondary calcination temperature was maintained irrespective of the reaction time.

EXAMPLE 3

Catalysts were prepared in the same manner as in Example 2, except that the secondary calcination temperature was fixed to 675° C. and the Co content was changed as shown in Table 3. Carbon nanotube aggregates were synthesized using the catalysts in the same manner as in Example 2. When the reaction times were 1 h and 2 h, the yields and bulk densities of the carbon nanotube aggregates are shown in Table 3.

TABLE 3

| Entry | Catalyst | Co content (wt %) | Reaction time (h) | Yield (times) | Bulk density (kg/m³) |
|---|---|---|---|---|---|
| 1 | CoV/ATH400-675 | 11.8 | 1 | 14.77 | 28 |
| | | | 2 | 23.90 | 30 |
| 2 | CoV/ATH400-675 | 15 | 1 | 25.50 | 44 |
| | | | 2 | 57.00 | 60 |
| 3 | CoV/ATH400-675 | 17.7 | 1 | 21.67 | 56 |
| | | | 2 | 40.04 | 62 |
| 4 | CoV/ATH400-675 | 20 | 1 | 21.36 | 60 |
| | | | 2 | 41.94 | 85 |

Figure 7:
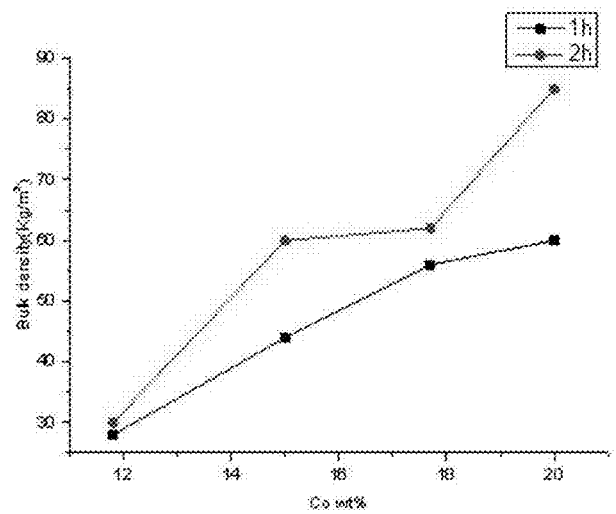
FIGS. 7 and 9 are graphs showing changes in the bulk density of carbon nanotube aggregates produced in Examples 3 and 4 with varying contents of a catalytic metal in the carbon nanotube aggregates, respectively.
Figure 8:
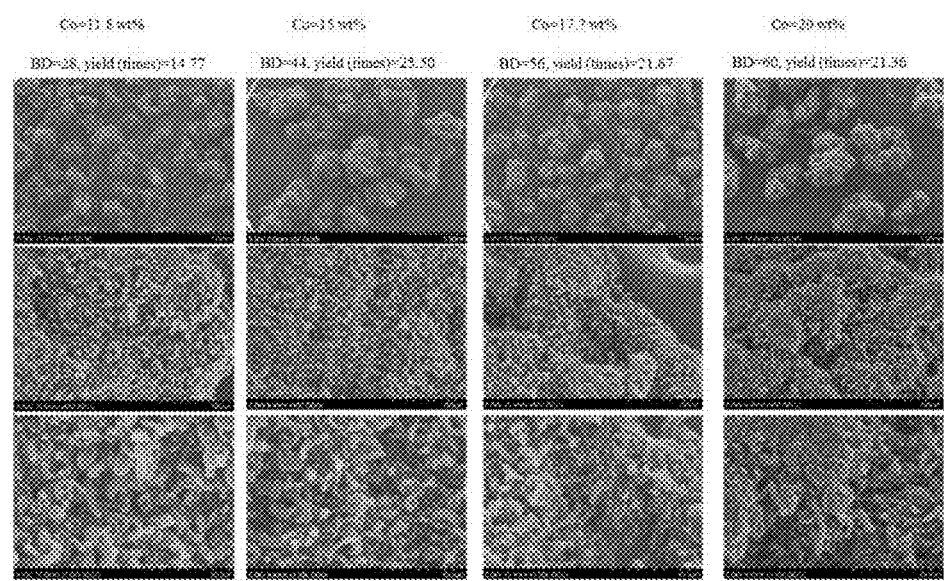
FIGS. 8 and 10 are SEM images of carbon nanotube aggregates produced in Examples 3 and 4, respectively.

The results in Table 3 are graphically shown in FIG. 7. FIG. 8 shows SEM images of the carbon nanotube aggregates.

EXAMPLE 4

Catalysts were prepared in the same manner as in Example 3, except that the content of Co was changed to 5.8 moles per mole of citric acid. Carbon nanotube aggregates were synthesized using the catalysts in the same manner as in Example 3. When the reaction times were 1 h and 2 h, the yields and bulk densities of the carbon nanotube aggregates are shown in Table 4.

TABLE 4

| Entry | Catalyst | Co content (wt %) | Reaction time (h) | Yield (times) | Bulk density (kg/m³) |
|---|---|---|---|---|---|
| 1 | CoV/ATH400-675 | 11.8 | 1 | 11.70 | 30 |
| | | | 2 | 20.33 | 29 |
| 2 | CoV/ATH400-675 | 15 | 1 | 18.53 | 45 |
| | | | 2 | 36.84 | 60 |
| 3 | CoV/ATH400-675 | 17.7 | 1 | 25.76 | 63 |
| | | | 2 | 41.26 | 68 |
| 4 | CoV/ATH400-675 | 20 | 1 | 27.58 | 81 |
| | | | 2 | 50.43 | 88 |

Figure 9:
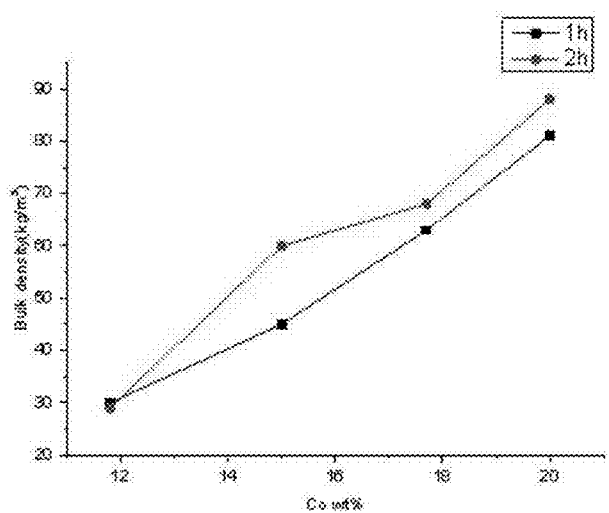
Figure 10:
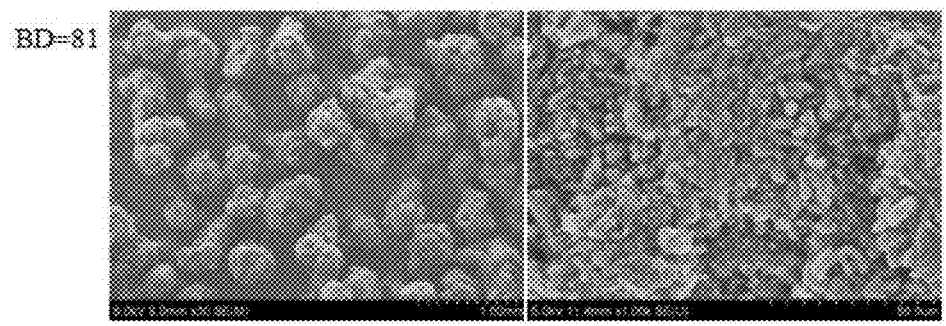

The results in Table 4 are graphically shown in FIG. 9. FIG. 10 shows SEM images of the carbon nanotube aggregate having a bulk density of 81 kg/m³.

From the results of Examples 3-4, it can be confirmed that the bulk density increased with increasing cobalt content and, as shown in FIG. 1 (reaction time=1 h) and 2 (reaction time=2 h), the bulk density and the cobalt content satisfy the relation given by the following equation:

$$y = a_1 x_1 + b_1 \quad (1)$$

where y represents the bulk density (kg/m³), $x_1$ represents the content of the catalytic metal relative to the total weight of the catalyst and is from 10 to 30 wt %, $a_1$ is a constant determined by the reaction time and is from 4 to 7, and $b_1$ is a constant determined by the reaction time and is from −15 to −40.

The SEM images of FIGS. 8 and 10 reveal that the carbon nanotube aggregates are of bundle types.

EXAMPLE 5

Changes in the yield and bulk density of carbon nanotube aggregates were observed with varying contents of cobalt per mole of citric acid as an organic acid. The results are shown in Table 5.

TABLE 5

| Entry | Catalyst | Co:citric acid (molar ratio) | Reaction time (h) | Yield (times) | Bulk density (kg/m³) |
|---|---|---|---|---|---|
| 1 | CoV/ATH300-675 | 28.9:1 | 1 | 20.14 | 26 |
|   |                |        | 2 | 36.68 | 38 |
| 2 | CoV/ATH300-675 | 9.6:1  | 1 | 28.22 | 33 |
|   |                |        | 2 | 50.77 | 46 |
| 3 | CoV/ATH300-675 | 8.3:1  | 1 | 27.56 | 40 |
|   |                |        | 2 | 47.90 | 51 |
| 4 | CoV/ATH300-675 | 5.8:1  | 1 | 20.73 | 54 |
|   |                |        | 2 | 35.20 | 73 |

Figure 11:
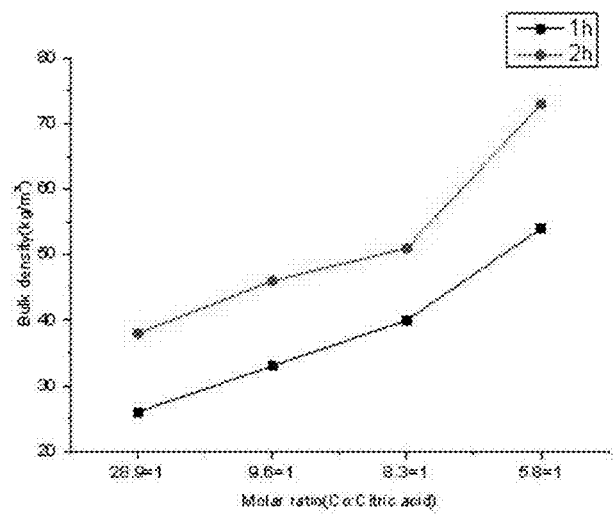
FIG. 11 is a graph showing changes in the bulk density of carbon nanotube aggregates produced in Example 5 with varying contents of a catalytic metal relative to an organic acid.
Figure 12:
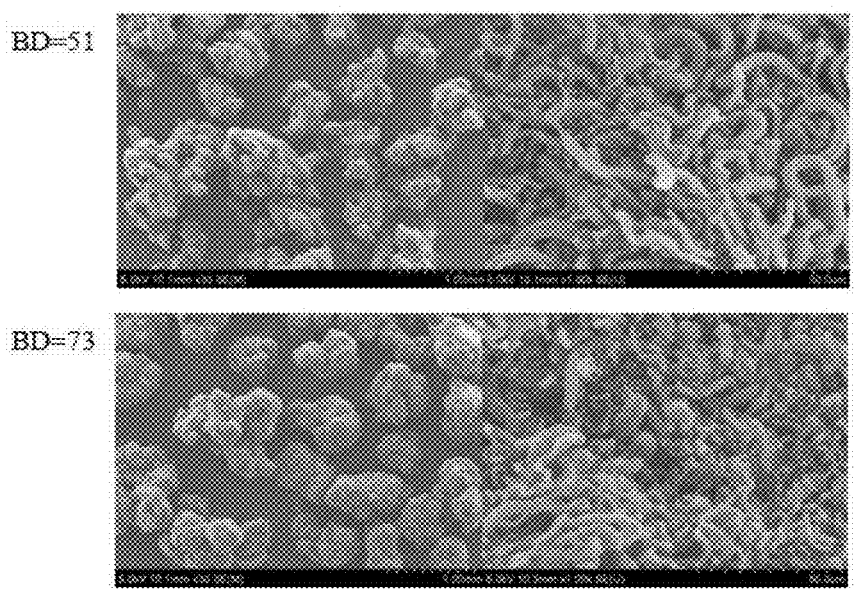
FIG. 12 shows SEM images of bundle type carbon nanotube aggregates produced in Example 5.

The results in Table 5 are graphically shown in FIG. 11. FIG. 12 shows SEM images of the carbon nanotube aggregates having bulk densities of 51 and 73 kg/m³. The results demonstrate that the bulk density increases with increasing Co content relative to the organic acid and the carbon nanotube aggregates are of bundle types. As shown in FIGS. 3 and 4, the Co content relative to the organic acid and the bulk density satisfy the relation given by the following equation:

$$y = a_2 x_2 + b_2 \quad (2)$$

where y represents the bulk density (kg/m³), $x_2$ represents the number of moles of the catalytic metal per mole of the organic acid, $a_2$ is a constant from 1 to 1.5, and $b_2$ is a constant from 20 to 40.

EXAMPLE 6

Carbon nanotube aggregates were produced in the same manner as in Example 2, except that the catalysts shown in Table 6 were reacted with nitrogen, ethylene, and hydrogen in a ratio of 5.5:1:1 for 2 h in a fluidized bed reactor on a laboratory scale. Specifically, each catalyst for carbon nanotube synthesis was heated to 675° C. in a quartz tube having an inner diameter of 58 mm and a length of 1200 mm under a nitrogen atmosphere. A mixed gas of nitrogen, hydrogen and ethylene gas in a volume ratio of 5.5:1:1 was allowed to flow at a rate of 4000 ml/min for a total of 2 h while maintaining the same temperature, affording a predetermined amount of a carbon nanotube aggregate.

The yields and bulk densities of the carbon nanotube aggregates are shown in Table 6.

3 wt % of each carbon nanotube aggregate was mixed with polycarbonate (MI 22). The mixture was melt extruded using a twin-screw extruder at 240-280° C. to manufacture a compound in the form of pellets. A specimen of the compound was prepared for conductivity measurement. The surface resistivity of the specimen was measured using SRM-110 (PINION).

TABLE 6

| Entry | Catalyst/Calcination temperature | Co:Citric acid (molar ratio) | Yield (times) | Bulk density (kg/m³) | Surface resistivity (ohm/sq) |
|---|---|---|---|---|---|
| 1 | CoV/ATH400-675 | 5.8:1 | 33 | 80 | $10^{11.5}$ |
| 2 | CoV/ATH400-675 | 23:1  | 30 | 58 | $10^{8}$ |
| 3 | CoV/ATH400-675 | 23:1  | 26 | 47 | $10^{7.3}$ |
| 4 | CoV/ATH300-675 | 23:1  | 26 | 36 | $10^{6.8}$ |

Figure 13:
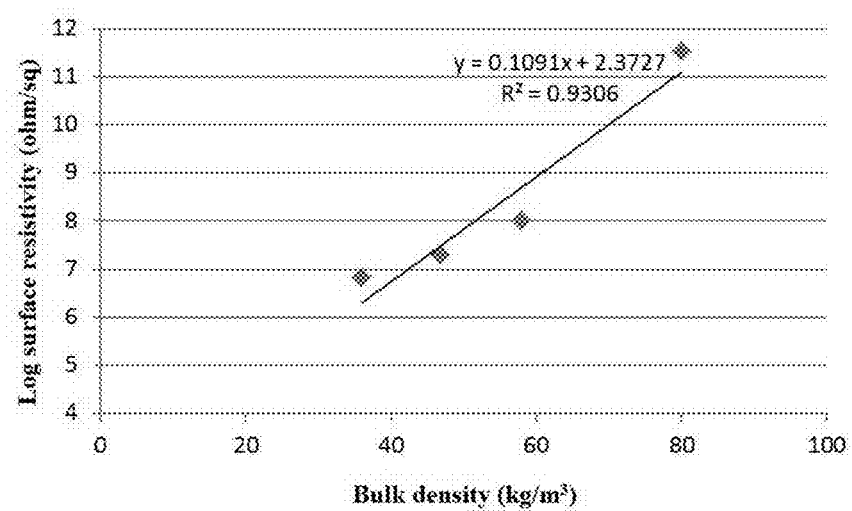
FIG. 13 is a graph showing the surface resistances of polymeric compounds containing carbon nanotube aggregates produced in Example 6.

The results in Table 6 show that the bulk densities of the carbon nanotube aggregates greatly affect the conductivities of the polymeric compounds. As can be seen from FIG. 13, the surface resistivity increases in proportion to the bulk density while satisfying the relation given by the following inequality:

$$0.1 x_3 + 1 \leq \text{Log } R \leq 0.1 x_3 + 4 \quad (3)$$

where $x_3$ represents the bulk density (kg/m³) of the carbon nanotube aggregate and R represents the surface resistivity (ohm/sq) of the composite material.

Therefore, the conductivities of the compounds can be controlled by appropriately varying the bulk densities of the carbon nanotube aggregates.

These results lead to the conclusion that the bulk densities of the carbon nanotube aggregates can be controlled at a predetermined level by varying the processing conditions, such as the catalyst content, the reaction time, and the calcination temperatures. In addition, the physical properties (e.g., conductivities) of carbon nanotube composites can be controlled by varying the bulk densities of the carbon nanotube aggregates.

As is apparent from the foregoing, the method of the present invention enables the production of a bundle type carbon nanotube aggregate that is readily dispersible in and miscible with other materials and whose bulk density is controllable. Therefore, the bundle type carbon nanotube aggregate can be used to manufacture a composite material with improved physical properties. As a result, the carbon nanotube aggregate is suitable for use in various fields, such as energy materials, functional composites, pharmaceuticals, batteries, semiconductors, display devices, and manufacturing methods thereof.

What is claimed is:

1. A method for producing a carbon nanotube aggregate, comprising:
   calcining aluminum hydroxide at a primary calcination temperature of 300° C. to 500° C. to form a support comprising 40 wt % or more of AlO(OH),
   impregnating a catalytic metal precursor on the support,
   calcining the catalyst-containing support at a secondary calcination temperature of 550° C. to 800° C. to obtain a supported catalyst, and
   bringing the supported catalyst into contact with a carbon-containing compound under heating to react with each other, wherein the primary calcination temperature, the secondary calcination temperature, the amount of the catalyst supported or the reaction time is controlled such that the carbon nanotube aggregate has a bulk density of 10 kg/m³ or more and less than 80 kg/m³, wherein the catalytic metal comprises cobalt (Co) and vanadium (V), wherein at least a portion of the carbon nanotube aggregate is of a bundle type, and wherein the method further comprises adding an organic acid such that the molar ratio of cobalt (Co) to organic acids is from 5.8:1 to 30:1 during the preparation of the supported catalyst, and the bulk density of the carbon nanotube aggregate is controlled by varying the amount of the organic acid added.

2. The method according to claim 1, wherein the secondary calcination temperature is higher by 200 to 400° C. than the primary calcination temperature.

3. The method according to claim 1, wherein the bulk density of the carbon nanotube aggregate increases with increasing secondary calcination temperature until 675° C. and thereafter decreases with increasing secondary calcination temperature.

4. The method according to claim 1, wherein the catalytic metal is present in an amount of 5 to 30% by weight, based on the total weight of the catalyst.

5. The method according to claim 1, wherein the content ($x_1$) of the catalytic metal and the bulk density (y) of the carbon nanotube aggregate satisfy the relation given by the following equation:

$$y = a_1 x_1 + b_1 \quad (1)$$

where y represents the bulk density (kg/m³), $x_1$ represents the content of the catalytic metal relative to the total weight of the catalyst and is from 10 to 30 wt %, $a_1$ is a constant determined by the reaction time and is from 4 to 7, and $b_1$ is a constant determined by the reaction time and is from −15 to −40.

6. The method according to claim 1, wherein the bulk density of the carbon nanotube aggregate increases by 1.2 to 1.5 times in proportion to the time (hr) of the reaction with the carbon-containing compound.

7. The method according to claim 1, wherein the number of moles ($x_2$) of the catalytic metal per mole of the organic acid and the bulk density (y) of the carbon nanotube aggregate satisfy the relation given by the following equation:

$$y = a_2 x_2 + b_2 \quad (2)$$

where y represents the bulk density (kg/m³), $x_2$ represents the number of moles of the catalytic metal per mole of the organic acid, $a_2$ is a constant from 1 to 1.5, and $b_2$ is a constant from 20 to 40.

8. The method according to claim 1, wherein the reaction with the carbon-containing compound is carried out in a fluidized bed reactor.

* * * * *